(12) United States Patent
Kim (10) Patent No.: US 7,556,659 B2
(45) Date of Patent: Jul. 7, 2009

(54) HIGH TEMPERATURE REFORMER

(76) Inventor: Hyun Yong Kim, 449-6 Pyeongchang-Dong, Jongro-Ku, Seoul (KR)

( * ) Notice: Subject to any disclaimer, the term of this patent is extended or adjusted under 35 U.S.C. 154(b) by 501 days.

(21) Appl. No.: 11/100,764

(22) Filed: Apr. 6, 2005

(65) Prior Publication Data
US 2005/0223644 A1 Oct. 13, 2005

(30) Foreign Application Priority Data
Apr. 9, 2004 (KR) .................. 10-2004-0024675
Nov. 16, 2004 (KR) .................. 20-2004-0032456 U (51) Int. Cl.
C10J 3/20 (2006.01)
C10J 3/48 (2006.01)
C10J 3/82 (2006.01)

(52) U.S. Cl. .................. 48/61; 48/62 R; 48/77; 48/76; 48/89; 48/101

(58) Field of Classification Search .......... 48/198.2, 48/199 FM, 61, 77, 85, 127.1, 127.3, 127.5, 48/128, 62 R, 76, 89, 111, 101; 208/46, 208/49, 50, 51, 52 R, 53, 56, 78, 79; 110/203, 110/210, 211, 212, 214, 229, 232, 267, 208, 110/284, 293, 317, 327, 108, 101 R; 431/91, 431/363, 365, 115, 129, 157, 158, 161
See application file for complete search history.

(56) References Cited

U.S. PATENT DOCUMENTS

| | | | | |
|---|---|---|---|---|
| 2,805,188 A | * | 9/1957 | Josenhans | ............ 201/4 |
| 3,759,677 A | | 9/1973 | White | |
| 3,823,227 A | | 7/1974 | White | |
| 3,955,941 A | * | 5/1976 | Houseman et al. | ............ 48/95 |
| 4,412,975 A | * | 11/1983 | Parizot et al. | ............ 422/197 |
| 4,659,634 A | * | 4/1987 | Struthers | ............ 429/19 |
| 5,145,491 A | | 9/1992 | Schmitt et al. | |
| 5,370,715 A | | 12/1994 | Kortzeborn et al. | |
| 5,554,351 A | * | 9/1996 | Primdahl | ............ 423/245.3 |
| 5,656,044 A | | 8/1997 | Bishop et al. | |
| 5,851,246 A | * | 12/1998 | Bishop et al. | ............ 48/122 |

(Continued)

FOREIGN PATENT DOCUMENTS

CN 01804839.0 3/2003

(Continued)

OTHER PUBLICATIONS

Translation of German Patent DE19536383 to F. Ludtke—Nov. 2007.*

(Continued)

*Primary Examiner*—Walter D Griffin
*Assistant Examiner*—Huy-Tram Nguyen
(74) *Attorney, Agent, or Firm*—Paul, Hastings, Janofsky & Walker LLP; Jane I. Song (57) ABSTRACT

A method of gasifying organic materials (carbonaceous compounds) such as coal and fossil fuel and their mixtures including gasifying wastes into syngas, and an apparatus thereof. The apparatus is suitable to gasify carbonaceous wastes without secondary pollutants formed from oxidation. Further, the apparatus can be used in a system to drive a fuel cell.

22 Claims, 4 Drawing Sheets

U.S. PATENT DOCUMENTS

| | | | |
|---|---|---|---|
| 5,900,224 | A | 5/1999 | Fujimura et al. |
| 5,980,858 | A | 11/1999 | Fujimura et al. |
| 6,001,144 | A | 12/1999 | Takeuchi et al. |
| 6,063,355 | A | 5/2000 | Fujimura et al. |
| 6,084,147 | A | 7/2000 | Mason |
| 6,120,567 | A | 9/2000 | Cordell et al. |
| 6,174,160 | B1 * | 1/2001 | Lee et al. ............ 431/11 |
| 6,790,383 | B2 | 9/2004 | Kim |
| 7,070,634 | B1 * | 7/2006 | Wang ............ 48/61 |
| 2002/0046561 | A1 * | 4/2002 | Bronicki et al. ....... 60/39.182 |
| 2002/0113228 | A1 * | 8/2002 | Kim et al. ............ 252/373 |
| 2003/0102111 | A1 * | 6/2003 | Brinck ............ 165/135 |
| 2003/0106266 | A1 * | 6/2003 | Bryan et al. ......... 48/197 FM |
| 2004/0052724 | A1 * | 3/2004 | Sorace ............ 423/648.1 |
| 2005/0006228 | A1 * | 1/2005 | Hyun ............ 204/274 |
| 2005/0008907 | A1 | 1/2005 | Isozaki et al. |
| 2006/0112639 | A1 * | 6/2006 | Nick et al. ............ 48/198.1 |

FOREIGN PATENT DOCUMENTS

| | | | |
|---|---|---|---|
| DE | 4204787 A1 * | 8/1993 | |
| DE | 19536383 A1 * | 4/1997 | |
| DE | 19934649 | 1/2001 | |
| DE | 19934649 A1 | 1/2001 | |
| DE | 101 49 649 A1 | 4/2003 | |
| EP | 263339 A1 * | 4/1988 | |
| EP | 423401 A1 * | 4/1991 | |
| EP | 1 347 236 A | 9/2003 | |
| FR | 2831880 | 5/2003 | |
| FR | 2831880 A | 5/2003 | |
| JP | 06136371 A * | 5/1994 | |
| JP | 2002-549811 | 8/2002 | |
| KR | 1003911210000 | 6/2003 | |
| KR | WO 03066935 * | 8/2003 | |
| KR | 01/01717 | 6/2006 | |
| WO | WO 03/028876 A | 4/2003 | |

OTHER PUBLICATIONS

Kim, Hyun Yong, "Method of Gasifying Carbonaceous Waste and apparatus therfore", 2nd i-CIPEC Conference, Jeju, South Korea (Sep. 5, 2002).

Kim, Hyun Yong, "A New Approach to Steam Reforming Reactor; Carbonaceous Wastes are Gasified Into Syngas", International Conference on New Energy Systems and Conversions, Busan, Korea (Nov. 9, 2003).

Kim, Hyun Yong, "A Low Cost Production of Hydrogen from Carbonaceous Wastes", International Journal of Hydrogen Energy 28 (May 2003) pp. 1179-1186.

United States Environmental Protection Agency, "SITE Technology Capsule: Texaco Gasification Process," EPA 650/R-94/514a (Apr. 1995).

Kim, "Method of Gasifying Carbonaceous Waste and Apparatus Therefore," International Conference on Combustion, Incineration/ Pyrolysis and Emission Control, 2nd i-CIPEC, Jeju, S. Korea (Sep. 5, 2002).

Kim, "A New Approach to Steam Reforming Reactor; Cabonaceous Wastes Are Gasified Into Syngas," International Conference on New Energy Systems and Conversions, Bexco, Korea (2004).

Kim, "Gasification of Food and Sewer Sludge Thru Reformer," Korea Society of Waste Management, Fall Meeting, Busan, Korea (Nov. 11-12, 2004).

Local Energy Economics Weekly (news clips).

Local Environmental Technology Monthly Articles.

Kim, Hyun Yong, "A low cost production of hydrogen from carbonaceous wastes", Int. J. of Hydrogen Energy, vol. 28/11, pp. 1179-1186.

* cited by examiner

HIGH TEMPERATURE REFORMER

RELATED APPLICATIONS

This application claims the benefit of Korean Application Ser. No. KR 10-2004-0024675, filed Apr. 9, 2004 and Korean Application Ser. No. KR 20-2004-0032456, filed Nov. 16, 2004.

BACKGROUND OF THE INVENTION

1. Field of the Invention

The present invention relates to a method of gasifying organic materials (carbonaceous compounds) such as coal and fossil fuel and their mixtures including gasifying wastes into syngas, and an apparatus thereof.

2. Description of the Related Art

The reforming/gasification reaction is an endothermic reduction reaction and reaction heat must be supplied continuously for sustained operation. Furthermore, this reduction reaction is very slow at temperatures below 1200° C. See Kim, Hyun Yong *International Journal of Hydrogen Energy*, Vol. 28/11, pp. 1179~1186.

In the conventional method of gasification, oxygen gas is pumped into the gasification reactor to burn portions of carbonaceous feed material, and the heat generated from the combustion is used to maintain the reactor furnace at the elevated temperature. Further, an externally heated steam is supplied to promote gasification and to increase the concentration of hydrogen in the produced syngas. At any temperature below 1200° C., the reaction is extremely slow and metal catalysts are often used to promote the gasification.

U.S. Pat. No. 6,120,567 issued on Sep. 19, 2000, U.S. Pat. No. 6,084,147 issued on Jul. 4, 2000 and U.S. Pat. No. 6,001,144 issued on Dec. 14, 1999 describe the conventional steam reformation method of injecting $O_2$ gas and carbonaceous material into various two stage reactor to accomplish reforming reaction of organic material.

Also, U.S. Pat. No. 5,980,858 issued on Nov. 9, 1999 and U.S. Pat. No. 6,063,355 issued on May 16, 2000 describe a two stage steam reforming reactor to produce $H_2$ gas and leading to the production of $NH_3$ gas. U.S. Pat. No. 3,823,227 issued on Jul. 9, 1974 and U.S. Pat. No. 3,759,677 issued on Sep. 18, 1973 describe gasification by steam reformation of solid waste materials including solid municipal waste. The gasification reaction is carried out in the presence of an alkali metal carbonate catalyst at a temperature between 427 and 871° C.

In all of the above cases, where the reactor temperature does not reach 1200° C., very little of reformation/reduction reaction takes place, and production of syngas is minimal at best.

The oxidation reaction which takes place in gasification is indicated as follows:

(1)

(2)

Reaction 1 indicates the combustion reaction that usually occurs in coal whose main component is carbon, and Reaction 2 is the main combustion reaction occurring with carbonaceous material such as fossil fuel.

The requirement of oxygen, which varies with the aspect of coal (C) or fossil fuel (—$CH_2$—) supplied into the reactor, amounts to 0.5~1.0 weight of the coal or fossil fuel. The oxygen supplied into the reactor is consumed according to Reactions 1 and 2 to increase the reactor temperature and produce combustion products, $H_2O$ and $CO_2$.

The combustion products reduce all carbon atoms of coal as shown in Reactions 3 and 4. The gasification reaction requires longer reaction time as compared with combustion reaction and higher temperature to continue the reaction. The gasification reactions of organic material such as fossil fuel (—$CH_2$—) are shown as Reactions 5 and 6.

(3)

(4)

(5)

(6)

While the Reactions 1 and 2 are oxidation reactions, the Reactions 3 to 6 are reduction reactions. The gas produced from the reactions 3 to 6 is syngas whose main components are CO and $H_2$. Under the reaction condition of 1200° C. and higher, all carbon atoms and hydrogen atoms in the reactor are effectively reduced to CO and $H_2$ gases. And no other carbon atom of any other oxidation state can remain in the reactor. Syngas is the dominant product.

In conventional gasification methods, gasification or reforming reactions (Reactions 3 to 6) utilize the exothermic heat of oxidation reactions (Reactions 1 and 2) which is induced by oxygen supplied with coal or carbonaceous material, in order to maintain the temperature of the gasification reactor. Further, an additional supply of steam is often required to increase the concentration of syngas. The steam is acquired by means of heat exchange with the output syngas.

As described in the above, in conventional gasification methods, oxidation reactions (Reactions 1 and 2), and reduction reactions (Reactions 3 to 6) occur concurrently in the same space, and therefore, the production of syngas is minimal and secondary pollution from the oxidation of feed material usually occurs.

Figure 1:
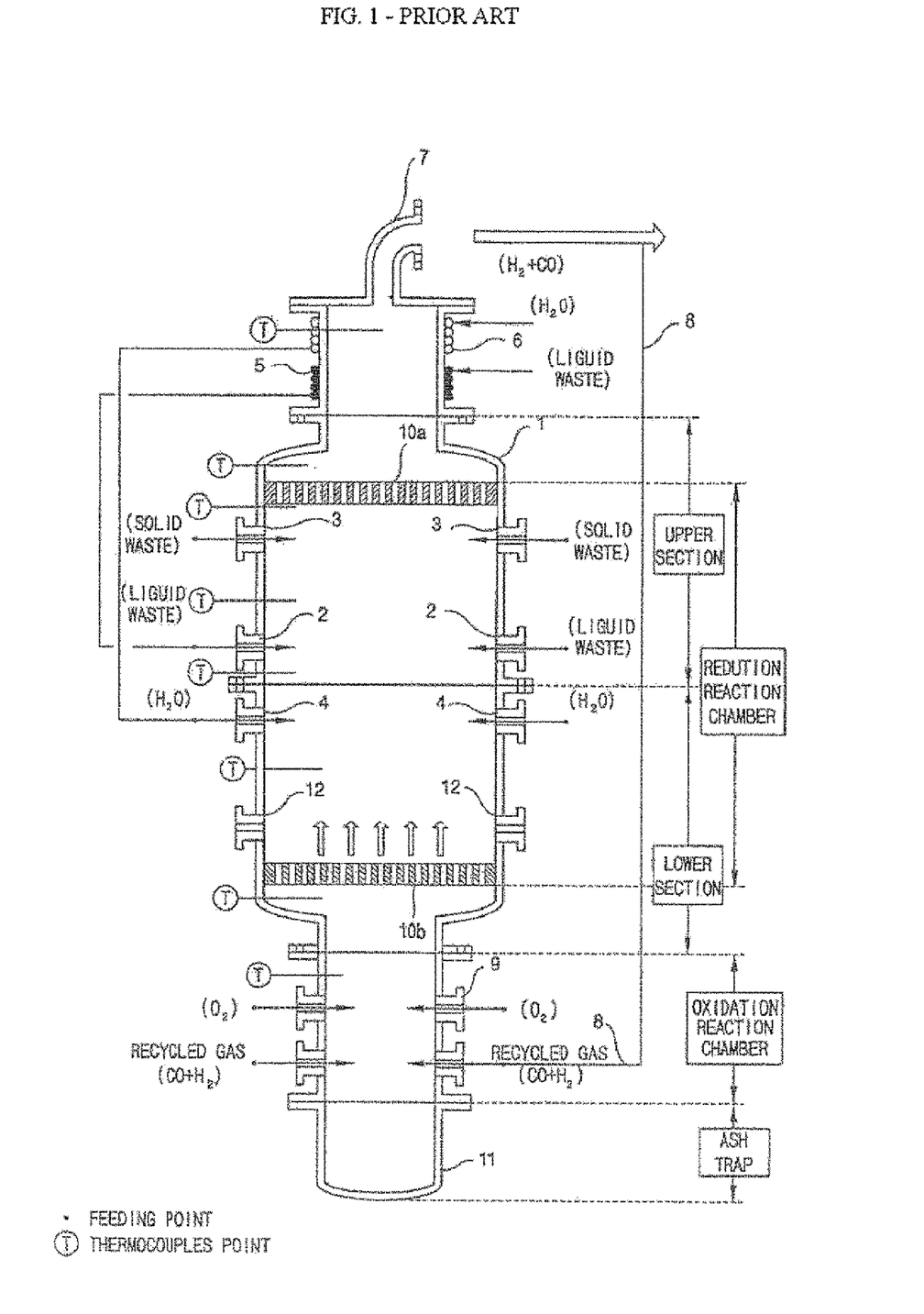
FIG. 1 schematically illustrates the reformer apparatus described in Korean Pat. No. 0391121 issued on Jun. 30, 2003 and U.S. Pat. No. 6,790,383 B2 issued on Sep. 14, 2004.

KR. Pat. No. 0391121, Jun. 30, 2003 and U.S. Pat. No. 6,790,383 B2. issued on Sep. 14, 2004, titled "METHOD OF GASIFYING CARBONACEOUS MATERIALS" describes a gasification method and apparatus where carbonaceous compounds such as coals, shredded waste tire or waste oil are gasified into gaseous fuel, CO and $H_2$. According to this apparatus, the reformer body (reduction reaction chamber) and the syngas burner (oxidation reaction chamber) are stacked vertically as shown in FIG. 1. With this configuration $O_2$ gas containment within the syngas burner is not completely assured. As the throughput of the reformer is increased, more of $O_2$ gas in the syngas burner escapes into the reduction reaction chamber, without being completely consumed within the syngas burner. Further the input port for the solid feed stock is placed at the upper portion of the reduction reaction chamber body. However, this is not the optimal placement of the solid feed stock since this is not the coolest place in the reformer body. The coolest place is at the bottom of the reformer body.

SUMMARY OF THE INVENTION

In one aspect, it is the object of the present invention to create an apparatus best suited for the gasification method. The apparatus of the present invention can be a general purpose reformer which reduces all carbonaceous material in a single stage reactor to syngas. This reformer is particularly suitable for gasification of waste material, since no $O_2$ gas is allowed to enter into the reducing chamber of the reactor and therefore, there are no oxidized products of the feed stocks, and no secondary pollutants created. Under these reaction conditions, all carbonaceous matter is reduced down to CO and $H_2$ gases.

In one embodiment, the gasification reactor includes a reduction reaction chamber where the reduction reaction takes place and an oxidation reaction chamber where the oxidation takes place. The oxidation reaction chamber is disposed substantially orthogonal to the reduction reaction chamber. By placing the oxidation reaction chamber substantially orthogonal to the reduction reaction chamber, $O_2$ gas is better contained in the burner and completely consumed. Consequently little $O_2$ gas escapes into the reduction reaction chamber. The oxidation reaction chamber includes a gas inlet and a gas outlet. The gas outlet of the oxidation chamber is in communication with the gas inlet of the reduction reaction chamber.

In one detailed embodiment, the oxidation chamber includes a first gas inlet for receiving syngas and a pair of second gas inlets for receiving oxygen gas. It also includes an ignition hole for initiating the reaction.

The reduction reaction chamber is substantially vertically oriented and the gas inlet disposed below the gas outlet of the reduction reaction chamber. The reduction reaction chamber also has a feedstock inlet for receiving carbonaceous material, which is located at the bottom of the reduction reaction chamber. Solid feedstock is fed into the inlet of reduction reaction chamber by means of a screw feeder disposed adjacent to the reduction reaction chamber.

In another detailed embodiment, the reduction reaction chamber is substantially vertically oriented and the gas inlet is disposed below the gas outlet of the reduction reaction chamber. The reduction reaction chamber also has a feedstock inlet for receiving carbonaceous material, which is located at the bottom of the reduction reaction chamber. The solid feedstock is fed into the inlet of reduction reaction chamber by means of a screw feeder disposed adjacent to the reduction reaction chamber.

In another detailed embodiment, the reduction reaction chamber includes an inner lining, and insulating layer, and outer layer.

In one embodiment, the oxidation reaction chamber may be a syngas burner. Syngas is combusted with $O_2$ gas and generate streams of ultra hot (>2000° C.) $H_2O$ and $CO_2$ molecules, and solid carbonaceous stock feeder is placed at the bottom of the reactor.

In another embodiment, the oxidation reaction chamber is a Browngas burner. The browngas burner may contain an inlet for browngas, an ignition hole, and an outlet to the reduction reaction chamber.

Another aspect of the invention features a system and a method for driving a fuel cell. In one embodiment, the system includes a reformer apparatus and fuel cell. For example, the reformer apparatus has an inlet for gaseous and liquid fossil fuels, an inlet for hot water and $CO_2$, and an outlet for the syngas. In one detailed embodiment, an electric heater is in contact with the reformer apparatus. The fuel cell includes an inlet for syngas and an inlet for $O_2$ gas. The system also includes a means for transferring power from the fuel cell to the electric heater and a means for transporting hot water and $CO_2$ from the fuel cell to the reformer apparatus.

The reformer apparatus produces syngas, which is fed into the fuel cell. Oxygen gas is also fed into the fuel cell. The fuel cell produces hot water and $CO_2$ which is transported to the reformer. Energy generated by the fuel cell is used to heat the reformer.

The present invention is directed toward a gasification reactor comprising a reduction reaction chamber, the reduction reaction chamber comprising a feed stock inlet, a gas outlet, a body extending from the feedstock inlet to the gas outlet, and a gas inlet disposed along the side body; and an oxidation reaction chamber disposed substantially orthogonal to the reduction reaction chamber, the oxidation reaction chamber comprising a gas inlet and a gas outlet, wherein the gas outlet of the oxidation chamber is in communication with the gas inlet of the reduction reaction chamber.

In another aspect, the reduction occurs in the reduction chamber at a temperature of at least 1200° C.

In another aspect, the gas inlet and the gas outlet of the reduction reaction chamber are substantially vertically oriented with the gas inlet disposed below the gas outlet of the reduction reaction chamber and the gas inlet and the gas outlet of the oxidation reaction chamber are substantially horizontally oriented.

In another aspect, the reduction reaction chamber comprises an inner lining made of a material that is physically and chemically stable at temperatures above 1200° C. In a further aspect, the inner lining material is a ceramic material. In yet another aspect, the inner lining material is an aluminum oxide ceramic.

In another aspect, the reduction reaction chamber comprises an outer metal casing. In a further aspect, the outer casing is made of stainless steel.

In another aspect, the reduction reaction chamber further comprises an inner lining material and an inner insulating layer disposed between the outer metal casing and the inner lining material. In a further aspect, the inner insulating layer has a thickness ranging from about 100 mm to about 150 mm. In yet another aspect, the inner insulating layer comprises a composite of castables and rock wool.

In one aspect, the oxidation reaction chamber is a syngas burner. In another aspect, the oxidation reaction chamber is a browngas burner.

In one aspect, the feed stock inlet comprises a solid feed stock inlet. In another aspect, the feed stock inlet comprises a liquid feed stock inlet. In another aspect, there is a screw feeder disposed adjacent to the feed stock inlet of the reduction reaction chamber for controlling the introduction of the solid feed stock.

In one aspect, the gas inlet of the oxidation reaction chamber comprises a first gas inlet for receiving syngas and a pair of second gas inlets for receiving oxygen gas. In a further aspect, the pair of second gas inlets are disposed one on each side of the first gas inlet and the pair of second gas inlets are oriented at an angle with respect to the first gas inlet such that oxygen gas and syngas enter the chamber and react.

In one aspect, oxygen entering the oxidation chamber is fully consumed so that no oxygen enters the reduction reaction chamber.

In another aspect, syngas and oxygen gas are converted into $CO_2$ and $H_2O$ gas in the oxidation reaction chamber. In one aspect, the $CO_2$ and $H_2O$ gas are at a temperature greater than 2000° C.

In a further aspect, syngas is released through the gas outlet of the reduction reaction chamber. In another aspect, the released syngas is cooled to 100° C. or below and stored in a storage tank. In yet another aspect, the released syngas is cooled through a heat exchanger. In a further aspect, a portion of the released syngas is recycled to the oxidation chamber.

Also provided is a method of reforming carbonaceous matter comprising: providing a gasification reactor comprising a reduction reaction chamber and an oxidation reaction chamber, wherein the oxidation reaction chamber is disposed substantially orthogonal to the reduction reaction chamber; introducing oxygen gas and syngas into the oxidation reaction chamber; converting oxygen gas and syngas into $H_2O$ and $CO_2$ gas in the oxidation reaction chamber; supplying the $H_2O$ and $CO_2$ gas into the reduction chamber; introducing a feedstock comprising a carbonaceous matter into the reduction reaction chamber; and reducing the carbonaceous matter to $H_2$ and CO gases.

Another aspect of the invention is directed toward a method of reforming carbonaceous matter comprising: providing a gasification reactor comprising a reduction reaction chamber and an oxidation reaction chamber, wherein the oxidation reaction chamber is disposed substantially orthogonal to the reduction reaction chamber; introducing brown gas, consisting of oxygen and hydrogen, into the oxidation reaction chamber; converting oxygen and hydrogen gas into $H_2O$ gas in the oxidation reaction chamber; supplying the $H_2O$ gas into the reduction chamber; introducing a feedstock comprising a carbonaceous matter into the reduction reaction chamber; and reducing the carbonaceous matter to $H_2$ and CO gases.

In one aspect, the reduction of carbonaceous matter is performed without the presence of a catalyst.

Another aspect of the present invention is a system for driving a fuel cell comprising: a fuel cell; and a reformer in communication with the fuel cell, wherein the reformer body is configured to generate and supply syngas to the fuel cell; and wherein at least a portion of $H_2O$ and $CO_2$ generated by the fuel cell is supplied to the reformer to be used to generate additional syngas.

In one aspect, the system further comprises a heating mechanism for heating the reformer and wherein at least a portion of power generated by the fuel cell powers the heating mechanism. In another aspect, the reformer comprises a first inlet for receiving fossil fuel, a second inlet for receiving $H_2O$ and $CO_2$, and an outlet for releasing syngas. In one aspect, the fossil fuel comprises liquid fossil fuel. In another aspect, the fossil fuel comprises gaseous fossil fuel.

In one aspect, the reformer body is no greater than about 3 liters in size.

Another aspect of the present invention is a method for driving a fuel cell comprising: reforming fossil fuels into syngas in a reformer apparatus wherein the reformer is in communication with the fuel cell; providing $O_2$ gas to the fuel cell; transporting $H_2O$ and $CO_2$ from the fuel cell to the reformer; and using at least a portion of the power generated by the fuel cell to heat the reformer.

BRIEF DESCRIPTION OF THE DRAWINGS

The above and other features of the present invention will be apparent from the following detailed description of the preferred embodiments of the invention in conjunction with the accompanying drawings, in which.

BEST MODE FOR CARRYING OUT THE INVENTION

The reformer as depicted in FIG. 1, in which the oxidation chamber and the reduction chamber are stacked vertically, does not provide a good mechanism to introduce solid feed stocks. According to this apparatus, the reformer body (reduction reaction chamber) and the syngas burner (oxidation reaction chamber) are stacked vertically as shown in FIG. 1. With this configuration $O_2$ gas containment within the syngas burner is not completely assured. As the throughput of the reformer is increased, more of $O_2$ gas in the syngas burner escapes into the reduction chamber, without being completely consumed within the syngas burner. Further the input port for the solid feed stock is placed at the upper portion of the reduction reaction chamber body. However, this is not the optimal placement of the solid feed stock since this is not the coolest place in the reformer body. The coolest place is at the bottom of the reformer body.

Figure 2:
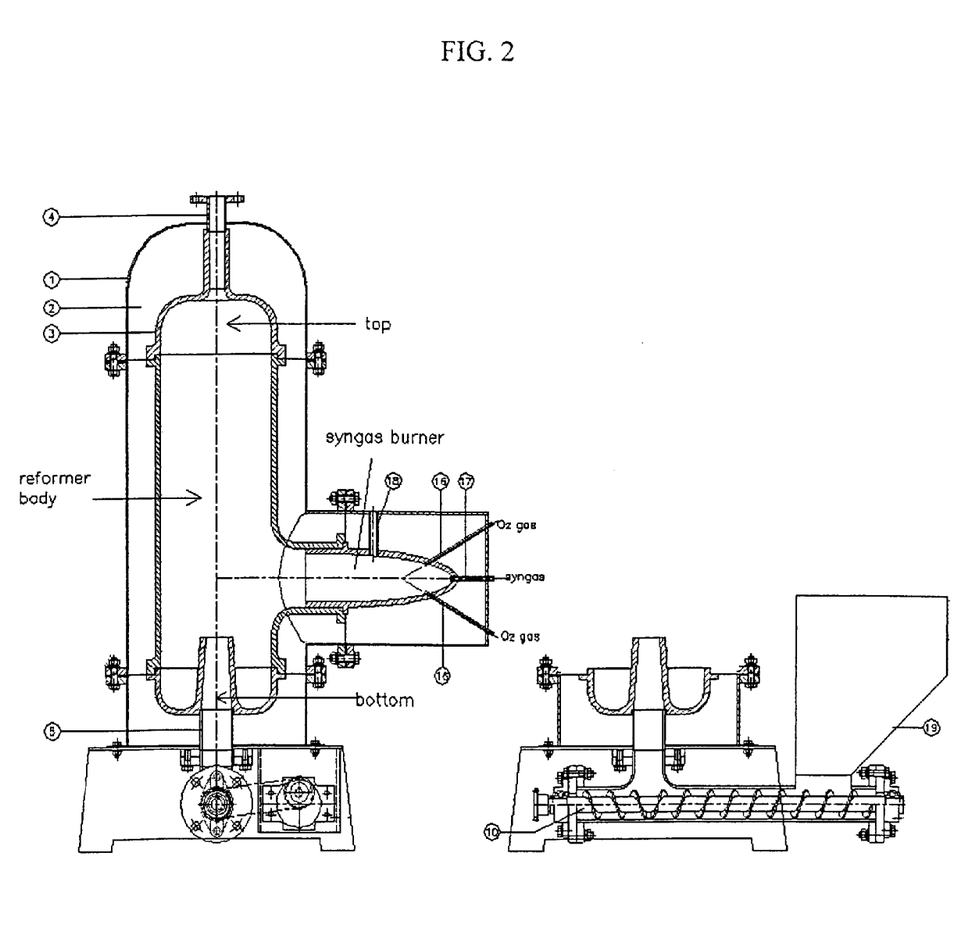
FIG. 2 schematically illustrates the reformer apparatus according to an embodiment of the present invention.

Referring to FIG. 2, in one embodiment, the reformer apparatus of the present invention, includes a reduction reaction chamber (reformer body) and an oxidation reaction chamber (syngas burner).

The reduction reaction chamber includes a feed stock inlet 5, a gas outlet 4, and a body. The body extends from the feedstock inlet 5 to the gas outlet 4. In the embodiment shown in FIG. 2, the reformer apparatus is cylindrical in shape. Alternatively, the reformer apparatus is of another shape and size sufficient to enable a reduction reaction to take place. Solid feed stocks are introduced at the bottom of the reformer body through the feed stock inlet, 5. Solid feed stock may be coal or waste material. For example, solid feed stocks such as coal and waste plastics that are shredded and degassed may be forced into reformer thru screw feeder 10 provided at the bottom of the reformer. The operation of a screw feeder is well known to those skilled in the art. Solid waste may be introduced into the screw feeder by means of a hopper 19.

In the embodiment of FIG. 2, the oxidation reaction chamber (syngas burner) is disposed substantially orthogonal to the reduction reaction chamber. The oxidation reaction chamber includes a gas inlet 17. Gas resulting from the oxidation reaction is introduced into the reduction reaction chamber. In this embodiment, oxidation reaction chamber and reduction reaction chamber are much better separated and therefore oxygen entering the oxidation reduction is fully consumed and is precluded from entering into the reduction reaction chamber.

In one detailed embodiment, syngas is introduced into the oxidation reaction chamber through the gas inlet 17 and oxygen is introduced into the oxidation reaction chamber through a pair of gas inlets 16 provided one on each side of the gas inlet 17. The inlets 16 are also provided at an angle to introduce the oxygen gas into the oxidation reaction chamber at an angle. This allows the oxygen gas and the syngas to converge and to react more effectively. An ignition hole 18 allows ignition of the reaction.

In one embodiment, the reduction reaction chamber and the oxidation reaction chamber each includes an outer metal casing 1 and an inner lining 3. The outer metal casing, for example, may be stainless steel. The inner lining, for example, may be a ceramic material such as aluminum oxide ceramic. The inner lining, preferably, is a material capable of withstanding a temperature greater than 1200° C. In another embodiment, an inner insulating material 2 is provided between the metal casing and the inner lining. The insulating layer, for example, may have a thickness ranging from about 100 mm to about 150 mm. The inner insulating layer may be made of a composite of castables and rock wool.

Figure 3:
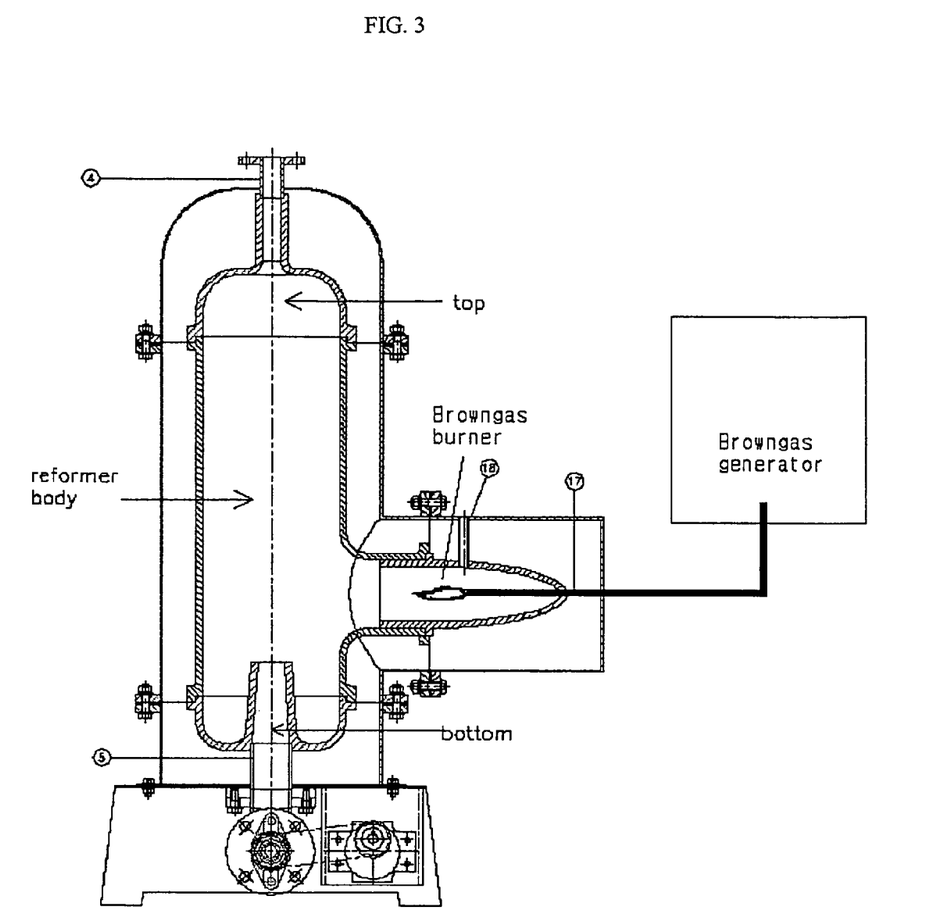
FIG. 3 schematically illustrates another version of the present invention, utilizing Browngas to heat the reactor.

Referring to FIG. 3, the gasification reactor includes an oxidation reaction chamber and a reduction reaction chamber. The reduction reaction chamber (reformer body) of the gasification reactor is substantially similar to the reduction reaction chamber shown in FIG. 2. The oxidation reaction chamber in this embodiment is a browngas burner. The oxidation reaction chamber includes an inlet 17 and an ignition hole 18. In one embodiment, browngas enters inlet 17 from a browngas generator.

The following is the operation of the reformer as shown in FIG. 2, according to the present invention:

(1) To initiate the gasification reaction of carbonaceous materials, the gasification reactor is at room temperature and is heated slowly by burning syngas in the syngas burner (FIG. 2), preheating is not necessary.

(2) Syngas from the syngas storage tank (or $H_2$ gas, if there is no syngas available) is introduced into the syngas burner through the syngas inlet 17, and then oxygen gas is also introduced thru oxygen inlets 16. Syngas is ignited by introducing a pilot light through ignition hole 18. The temperature rises suddenly with the ignition of syngas (or $H_2$ gas). The temperature is controlled by adjusting the oxygen intake while monitoring oxygen detector at the product gas outlet 4. At the end of the heating, oxygen gas is turned off first and then syngas is turned off causing the temperature to fall.

In this manner, when the temperature of the oxidation reaction reactor reaches greater than 1200° C. by controlling the amount of oxygen input, the oxidation reaction chamber becomes filled with $CO_2$ and $H_2O$, produced from the reaction of syngas with oxygen.

(3) While the temperature of the reduction reaction chamber is kept at greater than 1200° C., solid carbonaceous material, which is compressed, degassed and dried previously, is supplied into the reactor through the inlet 5. Under the temperature condition of greater than 1200° C., carbonaceous material reacts rapidly with ultra hot $CO_2/H_2O$ molecules supplied from the syngas burner and produces syngas whose main components are CO and $H_2$. As the reduction reaction proceeds, the reactor temperature settles down to about 1200° C.

(4) Syngas produced during the gasification reaction is discharged through the gas outlet 4 at the upper end of the reduction reaction chamber. The syngas, which is discharged from the reduction reaction chamber at about 1200° C., is cooled to 100° C. or below through a heat exchanger and then stored in a storage tank (not shown in FIG. 2).

(5) Recycled syngas from the storage tank (not shown in FIG. 2), may be used to react with oxygen in the syngas burner to produce $H_2O$ and $CO_2$ with exothermic heat. That is, the heat source required to maintain the reactor at 1200° C. is obtained by recycling a portion of the produced syngas which then reacts with oxygen. At this time, the temperature in the reactor is adjusted by controlling the supply of oxygen gas into the syngas burner. The combustion products of the recycled syngas, reduce carbon atoms of organic feed materials to produce syngas. The recycled syngas which remains unreacted in the syngas burner is discharged from the reactor with the rest of the produced syngas.

The operation of the reformer shown in FIG. 3 is substantially similar to the operation of the reformer shown in FIG. 2. A major difference is that instead of syngas, Browngas ($H_2$ and $O_2$ gas mixture) is ignited in the browngas burner, as shown in FIG. 3 producing $H_2O$ at much higher temperature (greater than 2500° C.). Ultra hot $H_2O$ moves into the reduction reaction chamber and maintains the reactor temperature at greater than 1200° C., and reforms carbonaceous matter into CO and $H_2$ gases. The Browngas burner is simple to operate and may serve as an auxiliary burner to the syngas burner of FIG. 2. The browngas generator is commercially available from BEST KOREA Co. KR. By using Browngas generator, gas handling devices are greatly simplified. A separate $O_2$ gas input to the burner is not necessary since the Browngas is the proportionate mixture of $H_2$ and $O_2$ gases generated by electrolysis of water.

As described above, according to the method of gasifying carbonaceous material by the gasification reactor equipped with syngas burner, the oxidation reaction is carried out only in the syngas burner and no oxygen is left to enter into the reformer (reduction reaction chamber), where only $H_2O$, $CO_2$, $H_2$ and CO gases are found. Therefore, there is no oxidized product of the carbonaceous feed stock within the reformer.

The reformer of the present invention is particularly suitable for gasifying carbonaceous wastes including hospital waste. The reformer is heated with exothermic heat arising from combustion of syngas in the syngas burner, where syngas is in excess of $O_2$ gas. The reformer can be operated such that no $O_2$ gas flows into the reformer. Therefore, the reforming reactor is filled with, $H_2O$, $CO_2$, CO and $H_2$ gases at a temperature greater than 1200° C. Under this condition, all carbon and hydrogen atoms reduce to CO and $H_2$ gases. No oxygenated pollutant is expected. HCl and $H_2S$ gases are expected from Cl and S contents in feed stock, but relatively inexpensive means of cleaning is known. Particularly for hazardous organic wastes, this is just about only means known for safe disposal. As to production of syngas, feedstock need not be clean or pure fossil fuel, it accepts a wide spectrum of carbonaceous matter. Thus, the production cost for hydrogen gas becomes very competitive.

Figure 4:
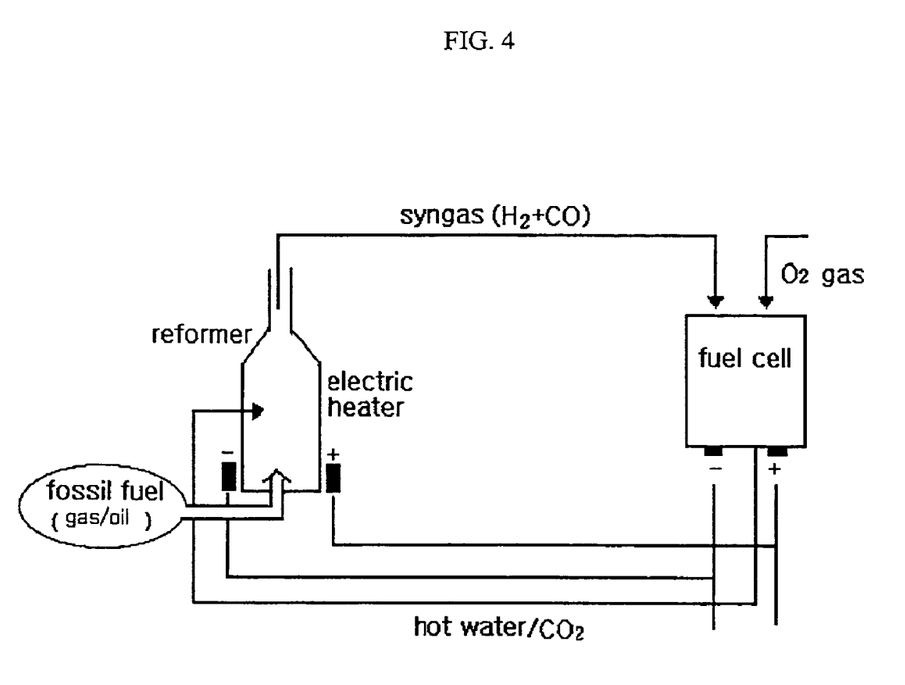
FIG. 4 schematically illustrates a system for driving a fuel cell.

FIG. 4 depicts a system for driving a fuel cell comprising: a fuel cell; and a reformer in communication with the fuel cell, wherein the reformer body is configured to generate and supply syngas to the fuel cell; and wherein at least a portion of $H_2O$ and $CO_2$ generated by the fuel cell is supplied to the reformer to be used to generate additional syngas.

The system shown in FIG. 4 may be used as a method for driving a fuel cell comprising: reforming fossil fuels into syngas in a reformer apparatus wherein the reformer is in communication with the fuel cell; providing $O_2$ gas to the fuel cell; transporting $H_2O$ and $CO_2$ from the fuel cell to the reformer; and using at least a portion of the power generated by the fuel cell to heat the reformer.

In one aspect, the system further comprises a heating mechanism for heating the reformer and wherein at least a portion of power generated by the fuel cell powers the heating mechanism. In another aspect, the reformer comprises a first inlet for receiving fossil fuel, a second inlet for receiving $H_2O$ and $CO_2$, and an outlet for releasing syngas.

While in accordance with the patent statutes, description of the various embodiments and examples have been provided, the scope of the invention is not to be limited thereto or thereby. Modifications and alterations of the present invention will be apparent to those skilled in the art without departing from the scope and spirit of the present invention.

Therefore, it will be appreciated that the scope of this invention is to be defined by the appended claims, rather than by the specific examples which have been presented by way of example.

What is claimed is:

1. A gasification reactor for reforming carbonaceous feed stock comprising:
   a single stage reduction reaction chamber that is substantially vertically oriented for reducing the carbonaceous feed stock, the reduction reaction chamber comprising:
   a feed stock inlet for receiving the carbonaceous feed stock, the feed stock inlet positioned to deposit the feed stock into an area within the reduction reaction chamber where a reduction reaction takes place;

a gas outlet for releasing gas generated from the reduction reaction, the gas outlet positioned to release gas directly from the area within the reduction reaction chamber where the reduction reaction takes place;

a body extending from the feed stock inlet to the gas outlet; and a gas inlet disposed along side the body; and an oxidation reaction chamber disposed substantially orthogonal to the reduction reaction chamber to consume substantially all oxygen introduced into the oxidation reaction chamber, the oxidation reaction chamber comprising a gas inlet for receiving at least oxygen and a gas outlet, wherein the gas outlet of the oxidation chamber is in communication with the gas inlet of the reduction reaction chamber.

2. The gasification reactor of claim 1 wherein a reduction occurs in the reduction chamber at a temperature of at least 1200° C.

3. The gasification reactor of claim 1 wherein the feed stock inlet is disposed below the gas outlet of the reduction reaction chamber.

4. The gasification reactor of claim 1 wherein the reduction reaction chamber comprises an inner lining made of a material that is physically and chemically stable at temperatures above 1200° C.

5. The gasification reactor of claim 4 wherein the inner lining material is a ceramic material.

6. The gasification reactor of claim 1 wherein the reduction reaction chamber comprises an outer metal casing.

7. The gasification reactor of claim 5 wherein the reduction reaction chamber further comprises an inner lining material and an inner insulating layer disposed between the outer metal casing and the inner lining material.

8. The gasification reactor of claim 4 wherein the inner lining comprises a composite of castables and rock wool.

9. The gasification reactor of claim 1 wherein the oxidation reaction chamber is a syngas burner.

10. The gasification reactor of claim 1 wherein the oxidation reaction chamber is a browngas burner.

11. The gasification reactor of claim 1 wherein the feed stock inlet comprises a solid feed stock inlet.

12. The gasification reactor of claim 1 wherein the feed stock inlet comprises a liquid feed stock inlet.

13. The gasification reactor of claim 11 further comprising a screw feeder disposed adjacent to the feed stock inlet of the reduction reaction chamber for controlling the introduction of the solid feed stock.

14. The gasification reactor of claim 1 wherein the gas inlet of the oxidation reaction chamber comprises a first gas inlet for receiving syngas and a pair of second gas inlets for receiving oxygen gas.

15. The gasification reactor of claim 1 wherein the pair of second gas inlets are disposed one on each side of the first gas inlet and the pair of second gas inlets are oriented at an angle with respect to the first gas inlet such that oxygen gas and syngas enter the chamber and react.

16. The gasification reactor of claim 1 wherein oxygen entering the oxidation chamber is fully consumed so that no oxygen enters the reduction reaction chamber.

17. The gasification reactor of claim 1 wherein the oxidation reaction chamber is further configured to receive syngas, and wherein the syngas and oxygen gas are converted into $CO_2$ and $H_2O$ gas in the oxidation reaction chamber.

18. The gasification reactor of claim 17 wherein the $CO_2$ gas and steam are at a temperature greater than 2000° C.

19. The gasification reactor of claim 1 wherein syngas is released through the gas outlet of the reduction reaction chamber.

20. The gasification reactor of claim 19 wherein the released syngas is cooled to 100° C. or below and stored in a storage tank.

21. The gasification reactor of claim 20 wherein the released syngas is cooled through a heat exchanger.

22. The gasification reactor of claim 19 wherein a portion of the released syngas is recycled to the oxidation reaction chamber.

* * * * *